(12) United States Patent
Tillman, Jr.

(10) Patent No.: US 6,217,128 B1
(45) Date of Patent: Apr. 17, 2001

(54) DUAL BRAKE VALVE FOR A STEERING ASSIST SYSTEM

(75) Inventor: Vincent J. Tillman, Jr., North Mankato, MN (US)

(73) Assignee: Mico, Inc., North Mankato, MN (US)

( * ) Notice: Subject to any disclaimer, the term of this patent is extended or adjusted under 35 U.S.C. 154(b) by 0 days.

(21) Appl. No.: 09/249,129

(22) Filed: Feb. 12, 1999

(51) Int. Cl.[7] .................................................. B60T 13/00
(52) U.S. Cl. ................................................................ 303/9.61
(58) Field of Search .............................. 303/9.61, 9.72, 303/9.74, 11, 14, 13, 6.01; 188/151 R, 152, 344, 350, 355, 358, 359, 360

(56) References Cited

U.S. PATENT DOCUMENTS

| | | |
|---|---|---|
| 3,945,685 | 3/1976 | Page et al. . |
| 3,945,691 | 3/1976 | Page et al. . |
| 4,010,983 | 3/1977 | Coupland . |
| 4,030,560 | 6/1977 | Parquet et al. . |
| 4,074,782 | 2/1978 | Bauer . |
| 4,139,238 | 2/1979 | Hoffman . |
| 4,260,197 | 4/1981 | Hawker . |
| 4,380,249 | 4/1983 | Behlmer et al. . |
| 4,399,896 | 8/1983 | Bahlmer . |
| 4,498,710 | 2/1985 | Smith . |
| 4,553,789 | 11/1985 | Pugh et al. . |
| 4,609,230 | 9/1986 | McCann . |
| 4,629,256 | 12/1986 | Fannin . |
| 4,691,968 | 9/1987 | Pugh et al. . |
| 4,880,282 | 11/1989 | Makino et al. . |
| 4,949,805 | 8/1990 | Mather et al. . |
| 4,962,825 | 10/1990 | Albright et al. . |
| 5,161,862 | * 11/1992 | Kunz ......................................... 303/9 |
| 5,354,123 | 10/1994 | Albert . |
| 5,380,073 | 1/1995 | Bartscher et al. . |
| 5,407,033 | 4/1995 | Weiler et al. . |
| 5,456,523 | 10/1995 | Boehringer . |
| 5,531,512 | 7/1996 | Thompson . |
| 5,735,314 | 4/1998 | Alaze et al. . |
| 5,778,672 | 7/1998 | Durant et al. . |
| 5,802,853 | 9/1998 | Oberst et al. . |

FOREIGN PATENT DOCUMENTS 0 272 032    6/1988   (EP) .

* cited by examiner

Primary Examiner—Christopher P. Schwartz
Assistant Examiner—C. T. Bartz
(74) Attorney, Agent, or Firm—Merchant & Gould P.C.

(57) ABSTRACT

The present disclosure relates to a valve arrangement for use with a steering assist system having left and right brake actuating members. The valve arrangement includes a valve body defining a left brake port adapted for connection to a left hydraulic brake and a right brake port adapted for connection to a right hydraulic brake. The valve arrangement also includes a left valve member for controlling hydraulic fluid flow through the left brake port, and a right brake valve member for controlling hydraulic fluid flow through the right brake port. The left brake valve member is adapted to be actuated by the left brake actuating member, and the right brake valve member is adapted to be actuated by the right brake actuating member. The valve arrangement also includes structure for providing equal hydraulic braking pressures to the left and right brakes through the left and right brake ports when the left and right brake actuating members have been actuated on equal amounts.

22 Claims, 14 Drawing Sheets

DUAL BRAKE VALVE FOR A STEERING ASSIST SYSTEM

FIELD OF THE INVENTION

The present invention relates generally to steering assist systems. More particularly, the present invention relates to hydraulic valving arrangements for steering assist systems or other systems where precise equal braking pressures are desirable.

BACKGROUND OF THE INVENTION

Steering assist vehicles are advantageous because they are highly maneuverable. A typical steering assist vehicle is turned by driving the wheels on one side of the vehicle at a different speed than the wheels on the other side of the vehicle. Also, turning can be achieved by stopping the wheels on one side of the vehicle, while driving the wheels on the other side of the vehicle. When braking a steering assist vehicle, it is desirable to have equal braking pressures on both sides of the vehicle to prevent unintentional turning. Examples of typical steering assist vehicles include farm tractors, construction backhoe loaders, farm combines, as well as other vehicles.

SUMMARY OF THE INVENTION

One aspect of the present invention relates to a valve arrangement for use with a steering assist system having left and right actuating members. The valve arrangement includes a valve body defining a left brake port adapted for connection to a left hydraulic brake and a right brake port adapted for connection to a right hydraulic brake. The arrangement also includes a left brake valve member for controlling hydraulic fluid flow through the left brake port, and a right brake valve member for controlling hydraulic fluid flow through the right brake port. The left and right brake valve members are adapted to the actuated, respectively, by left and right brake actuating members. The valve arrangement also includes means for providing the highest pressure present at either of the first and second brake valve members to both the first and second brake ports, wherein equal braking pressures are provided to the first and second brakes even when the first and second brake actuating members have been actuated unequal amounts.

Another aspect of the present invention relates to a steering assist system including left and right hydraulic brakes, and left and right actuating members for respectively actuating the left and right brakes. The system also includes a valve body defining a left brake port connected to the left hydraulic brake and a right brake port connected to the right hydraulic brake. The valve body also defines left and right brake pressure ports connected to a source of hydraulic pressure. The valve body further defines a left brake passageway for providing fluid communication between the left brake pressure port and the left brake port, and a right brake passageway for providing fluid communication between the right brake pressure port and the right brake port. The steering system further includes a left brake valve member for controlling hydraulic fluid flow through the left brake port and through the left brake pressure port, and a right brake valve member for controlling hydraulic fluid flow through the right brake port and through the right brake pressure port. The left and right brake valve members are respectively operatively coupled to corresponding left and right brake actuating members. A bypass passage arrangement provides fluid communication between the left brake passageway and the right brake port, and also provides fluid communication between the right brake passageway and the left brake port. A plurality of valves function to: (1) close the left brake passageway and direct hydraulic fluid from the right brake passageway through the bypass passage arrangement to the left brake port when the right brake actuating member has been actuated more than the left brake actuating member; and (2) close the right brake passageway and direct hydraulic fluid from the left brake passageway through the bypass passage arrangement to the right brake port when the left brake actuating member has been actuated more than the right brake actuating member.

A variety of advantages of the invention will be set forth in part in the description that follows, and in part will be apparent from the description, or may be learned by practicing the invention. It is to be understood that both the foregoing general description and the following detailed description are exemplary and explanatory only and are not restrictive of the invention as claimed.

BRIEF DESCRIPTION OF THE DRAWINGS

The accompanying drawings, which are incorporated in and constitute a part of this specification, illustrate several aspects of the invention and together with the description, serve to explain the principles of the invention. A brief description of the drawings is as follows.

DETAILED DESCRIPTION OF THE PREFERRED EMBODIMENT

Reference will now be made in detail to exemplary aspects of the present invention that are illustrated in the accompanying drawings. Wherever possible, the same reference numbers will be used throughout the drawings to refer to the same or like parts.

Figure 1:
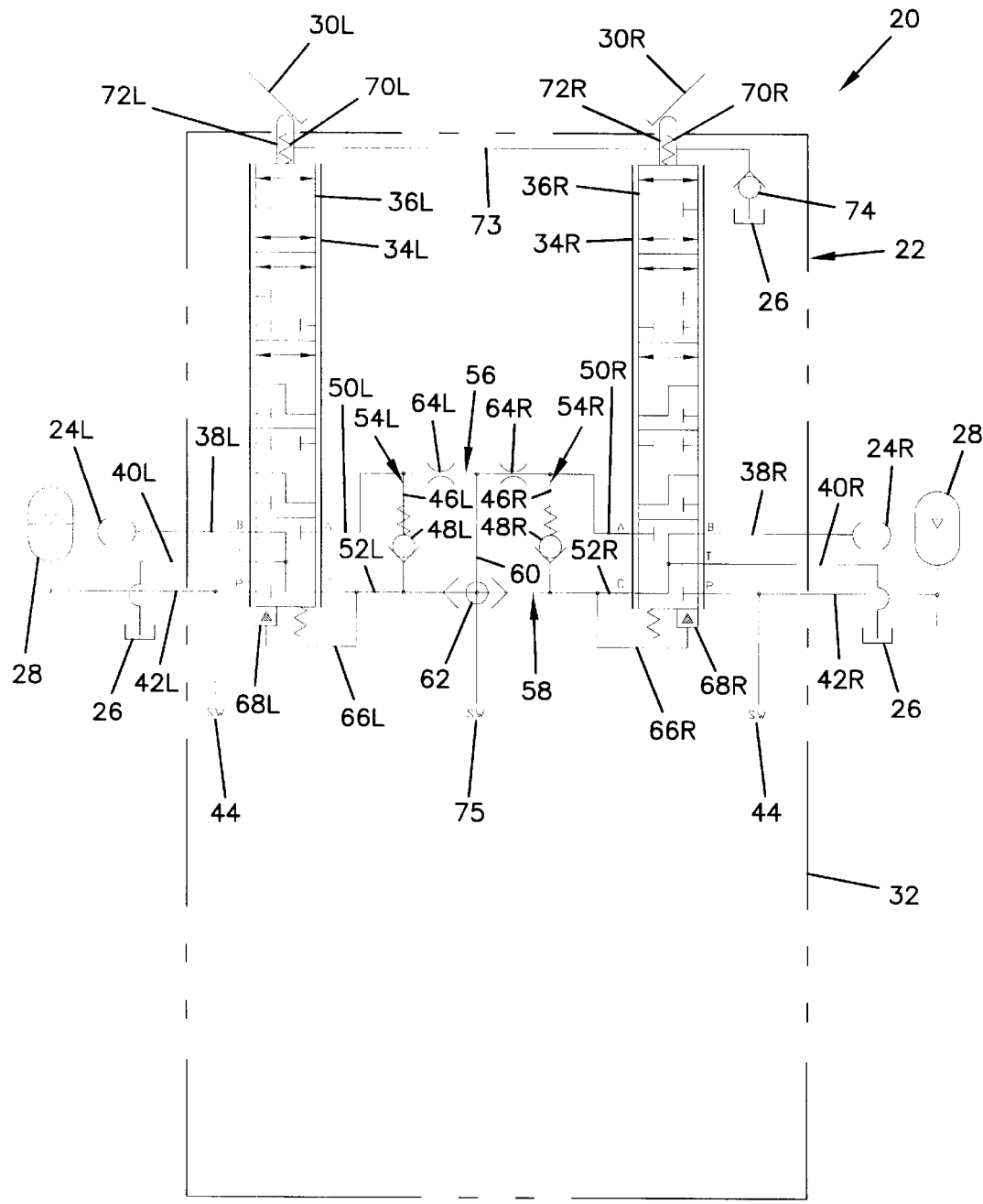
FIG. 1 is a schematic representation of an embodiment of a braking system including a brake valve in accordance with the principles of the present invention, push rods of the brake valve are shown in first, neutral positions.

FIG. 1 is a schematic representation of an embodiment of a steering assist system 20 in accordance with the principles of the present invention. The steering assist system 20 includes a full power dual brake valve 22 for controlling hydraulic fluid pressure to left and right hydraulic brakes $24_L$ and $24_R$. Hydraulic fluid (e.g., hydraulic oil) for pressurizing the brakes $24_L$ and $24_R$ is stored in a conventional reservoir or tank 26. Pressurized hydraulic fluid from the tank 26 is provided to the dual brake valve 22 by a source of pressure such as an accumulator 28. Preferably, a pump (not shown) is used to direct the hydraulic fluid from the tank 26 to the accumulator 28. The steering assist system 20 also includes left and right actuating members $30_L$ and $30_R$ (e.g., pedals or manual levers) for selectively actuating the dual brake valve 22 to either activate or deactivate the hydraulic brakes $24_L$ and $24_R$.

The dual brake valve 22 of the steering assist system 20 includes a valve body 32. The valve body 32 defines left and right push rod chambers $34_L$ and $34_R$. The push rod chambers $34_L$ and $34_R$ are substantially parallel and generally cylindrical in shape. Left and right push rods $36_L$, $36_R$ are respectively mounted in the left and right push rod chambers $34_L$ and $34_R$. The push rods $36_L$ and $36_R$ are adapted to slide axially within the push rod chambers $34_L$ and $34_R$. Preferably, the push rods $36_L$ and $36_R$ are mechanically coupled, respectively, to the left and right actuating members $30_L$ and $30_R$. By depressing or otherwise moving the actuating members $30_L$ and $30_R$, the push rods $36_L$ and $36_R$ are axially moved within the rod chambers $34_L$ and $34_R$ to provide selective activation and deactivation of the left and right hydraulic brakes $24_L$ and $24_R$.

The valve body 32 also defines a plurality of fluid passageways for conveying hydraulic fluid. For example, the valve body 32 defines left and right brake passages or ports $38_L$ and $38_R$, left and right tank passages or ports $40_L$ and $40_R$, and left and right pressure passages or ports $42_L$ and $42_R$. The left brake, tank and pressure ports $38_L$, $40_L$ and $42_L$ are each separate from one another and preferably extend from an exterior from the valve body 32 to the left push rod chamber $34_L$. Similarly, the right brake, tank and pressure ports $38_R$, $40_R$ and $42_R$ are preferably separate from one another and extend from the exterior of the valve body 32 to the right push rod chamber $34_R$. It will be appreciated that hydraulic hoses are preferably used to provide fluid communication between the brake ports $38_L$, $38_R$ and the hydraulic brakes $24_L$, $24_R$, between the tank ports $40_L$, $40_R$ and the tank 26, and between the pressure ports $42_L$, $42_R$ and the accumulator 28.

Pressure switches 44 are used to sense the pressure within the pressure ports $42_L$ and $42_R$. Preferably, the pressure switches 44 activate a warning signal if the pressure within the pressure ports $42_L$ and $42_R$ falls below a predetermined level.

The valve body 32 also defines an interior passage arrangement located between the left and right push rod chambers $34_L$ and $34_R$. For example, the passage arrangement includes left and right check valve passages $46_L$ and $46_R$. Left and right check valves $48_L$ and $48_R$ respectively control flow through the left and right check valve passages $46_L$ and $46_R$. The valve body 32 also defines first and second interior left ports $50_L$, $50_R$ and first and second interior right ports $50_R$, $50_L$.

The left ports $50_L$ and $52_L$ provide fluid communication with the left push rod chamber $34_L$, and the right ports $50_R$ and $52_R$ provide fluid communication with the right push rod chamber $34_R$. A left brake passageway $54_L$ loops from the left port $52_L$ through the check valve passage $46_L$ to the left port $50_L$. The check valve $48_L$ allows flow through the check valve passage $46_L$ in a direction toward the port $50_L$, and prevents flow in an opposite direction through the check valve passage $46_L$. A similar right brake passageway $54_R$ loops from the right port $52_R$ through the check valve passage $46_R$ to the right port $50_R$. The check valve $48_R$ allows flow through the check valve passage $46_R$ in a direction toward the port $50_R$, and prevents flow through the check valve passage $46_R$ in the opposite direction.

The valve body 32 further defines first and second cross-passageways 56 and 58 that extend between the check valve passageways $46_L$ and $46_R$. The first cross-passageway 56 is located on the upstream sides of the check valves $48_L$ and $48_R$ (i.e., the passageway 56 is located on the same side of the check valves $48_L$ and $48_R$ as the ports $50_L$ and $50_R$). The second cross-passageway 58 is located on the downstream side of the check valves $48_L$, $48_R$, (i.e., the passageway 58 is located on the same side of the check valves $48_L$, $48_R$ as the ports $52_L$ and $52_R$). A bypass line 60 interconnects the first and second cross-passageways 56 and 58. The bypass line 60 is shown as being generally parallel with respect to the check valve passages $46_L$ and $46_R$. A shuttle valve 62 is located at the intersection between the second cross-passageway 58 and the bypass line 60. Left and right orifices $64_L$ and $64_R$ are located along the first cross-passageway 56. The left orifice $64_L$ is located between the bypass line 60 and the left check valve passage $46_L$, and the right orifice $64_R$ is located between the bypass line 60 and the right check valve passage $64_R$. The orifices preferably have diameters in the range of 0.035–0.039 inches, and are preferably about 0.08 inches long. Of course, the dimensions are application specific and may vary depending upon the particular application in which the valve configuration is being used.

The valve further defines left and right hydraulic pilot passages $66_L$ and $66_R$ that respectively extend from ports $66_L$, $52_L$ to left and right hydraulic pilot volumes $68_L$ and $68_R$. In use of the dual brake valve 22, pressurized hydraulic fluid from the accumulator 28 travels through the hydraulic pilot passages $66_L$ and $66_R$ and into the hydraulic pilot volumes $68_L$ and $68_R$. The pressurized hydraulic fluid within the hydraulic pilot volumes $68_L$ and $68_R$ applies axial pressure or loading upon the push rods $36_L$ and $36_R$ in a direction opposite to the actuating forces provided by the actuating members $30_L$ and $30_R$ (i.e., toward the neutral positions of FIG. 1).

The steering assist system 20 also includes left and right spring assemblies $70_L$ and $70_R$ that form force transfer mechanisms between the actuating members $30_L$, $30_R$ and the push rods $36_L$, $36_R$. For example, if an operator slightly depresses the actuating members/pedals $30_L$, $30_R$, the spring assemblies $70_L$ and $70_R$ transfer relatively small axial loads to the push rods $36_L$, $36_R$. If the operator pushes harder on the actuating members/pedals $30_L$, $30_R$, the spring assemblies $70_L$ and $70_R$ transfer larger axial loads to the push rods $36_L$, $36_R$. The axial spring forces transferred by the spring assemblies $70_L$, $70_R$ are balanced by equal and opposite forces provided by pressurized hydraulic fluid within the hydraulic pilot volumes $68_L$ and $68_R$.

The spring assemblies $70_L$, $70_R$ are positioned within spring chambers $72_L$, $72_R$. The spring chambers $72_L$, $72_R$ are typically filled with hydraulic fluid that is maintained at tank pressure. A passageway 73 interconnects the two spring chambers $72_L$, $72_R$. A check ball 74 is used to close fluid communication between the spring chambers $72_L$, $72_R$ and the tank 26 at the time of brake release. By blocking flow between the tank 26 and the chambers $72_L$, $72_R$, the check ball 74 inhibits pedal/actuating member kick-back caused by increased tank line pressure during brake release. It will be appreciated that the chambers $72_L$, $72_R$ need not be filled with hydraulic fluid. However, hydraulic fluid commonly enters the chambers $72_L$, $72_R$ via leakage along the push rods $36_L$, $36_R$. Additionally, hydraulic fluid can also enter the chambers $72_L$, $72_R$ by flowing past the check ball 74 before the ball 74 reaches a closed position.

FIGS. 1–5 illustrate the dual brake valve 22 with the push rods $36_L$ and $36_R$ oriented in five different positions. For example, FIG. 1 shows each of the push rods $36_L$ and $36_R$ in a neutral first position. When the push rods $36_L$ and $36_R$ are in the first positions, the brake ports $38_L$ and $36_R$ are in fluid communication with the left and right ports $52_L$ and $52_R$, and the tank 26 is in fluid communication with the brake ports $38_L$, $36_R$ and the left and right ports $66_L$, $52_R$. Additionally, the pressure ports $42_L$, $42_R$ and the left and right ports $50_L$, $50_R$ are closed. In such a configuration, the check valves $48_L$, $48_R$ are biased closed, the shuttle valve 62 is in a central position, and the entire dual brake system is at tank pressure.

Figure 2:
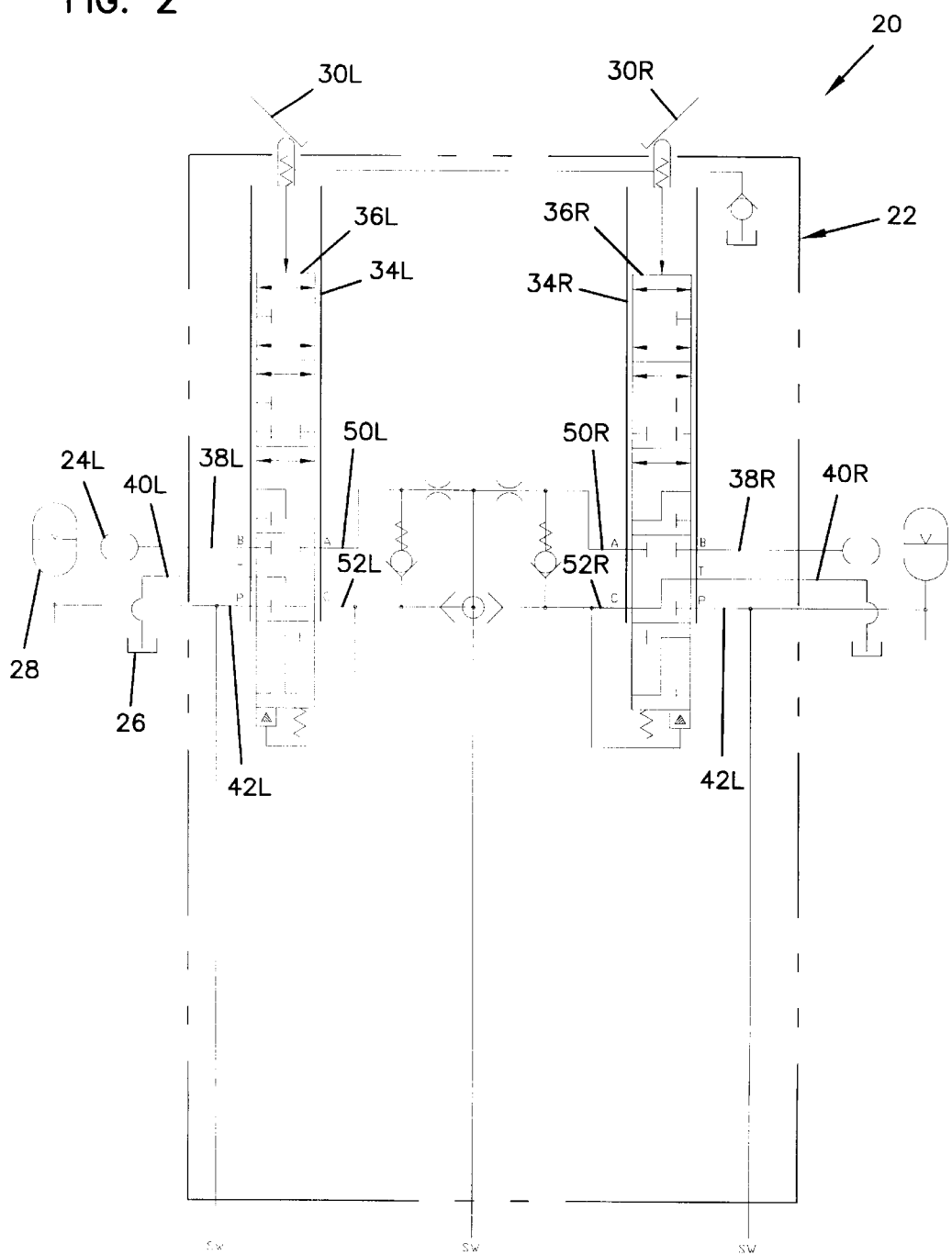
FIG. 2 is a schematic representation of the system of FIG. 1 with the push rods oriented in second positions.

FIG. 2 shows each of the push rods $36_L$, $36_R$ in a second position. With the push rods $36_L$, $36_R$ in the second position, the tank ports $40_L$, $40_R$ are respectively in fluid communication with the left and right ports $50_L$, $52_R$. Additionally, the brake ports $38_L$, $38_R$, the pressure ports $42_L$, $42_R$, and the left and right ports $50_L$, $50_R$ are closed.

Figure 3:
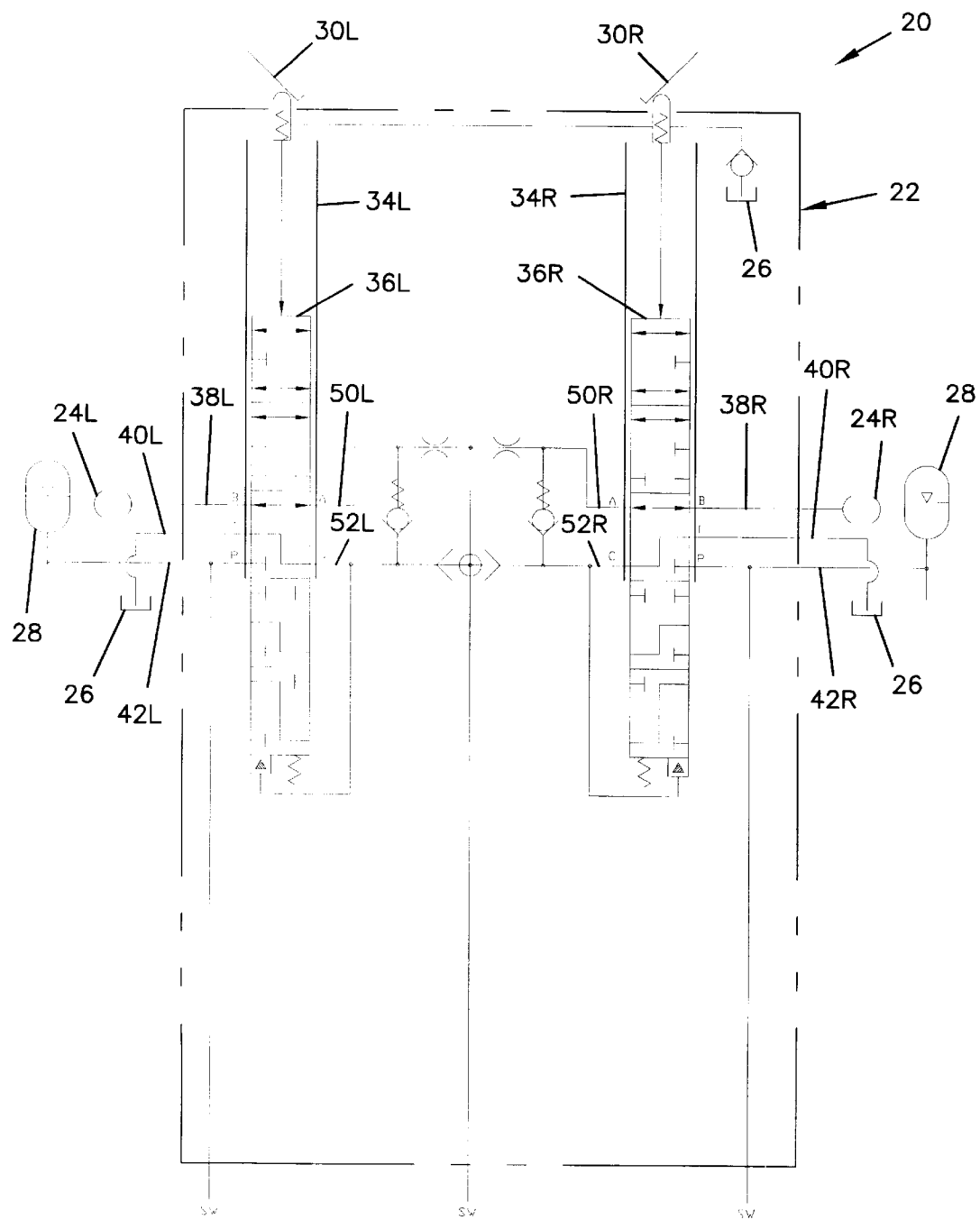
FIG. 3 is a schematic representation of the system of FIG. 1 with the push rods in third positions.

FIG. 3 shows each of the push rods $36_L$, $36_R$ in a third position. When the push rods $36_L$, $36_R$ are in the third positions, the brake ports $38_L$, $36_R$ are in fluid communication with their corresponding ports $50_L$, $50_R$, and the tank ports $40_L$, $40_R$ are in fluid communication with their corresponding ports $52_L$, $52_R$. Additionally, the pressure ports $42_L$, $42_R$ are closed.

Figure 4:
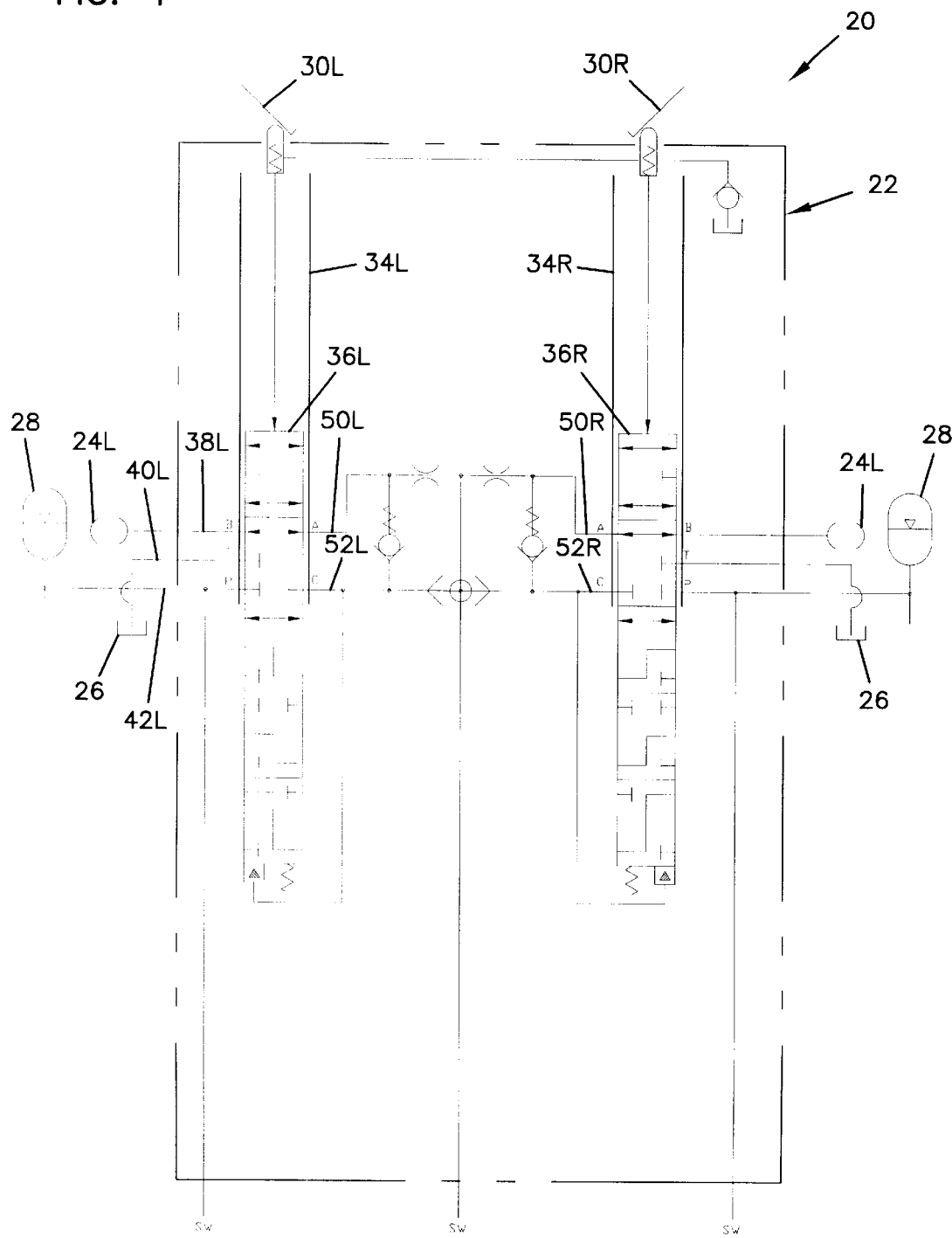
FIG. 4 is a schematic representation of the system of FIG. 1 with the push rods in fourth positions.

FIG. 4 shows each of the push rods $36_L$, $36_R$ in a fourth position. When each push rod $36_L$, $36_R$ is in the fourth position, the brake ports $38_L$, $36_R$ are in fluid communication with their corresponding ports $50_L$, $50_R$. Additionally, the tank ports $40_L$, $40_R$, the pressure ports $42_L$, $42_R$ and the ports $52_L$, $52_R$ are closed.

Figure 5:
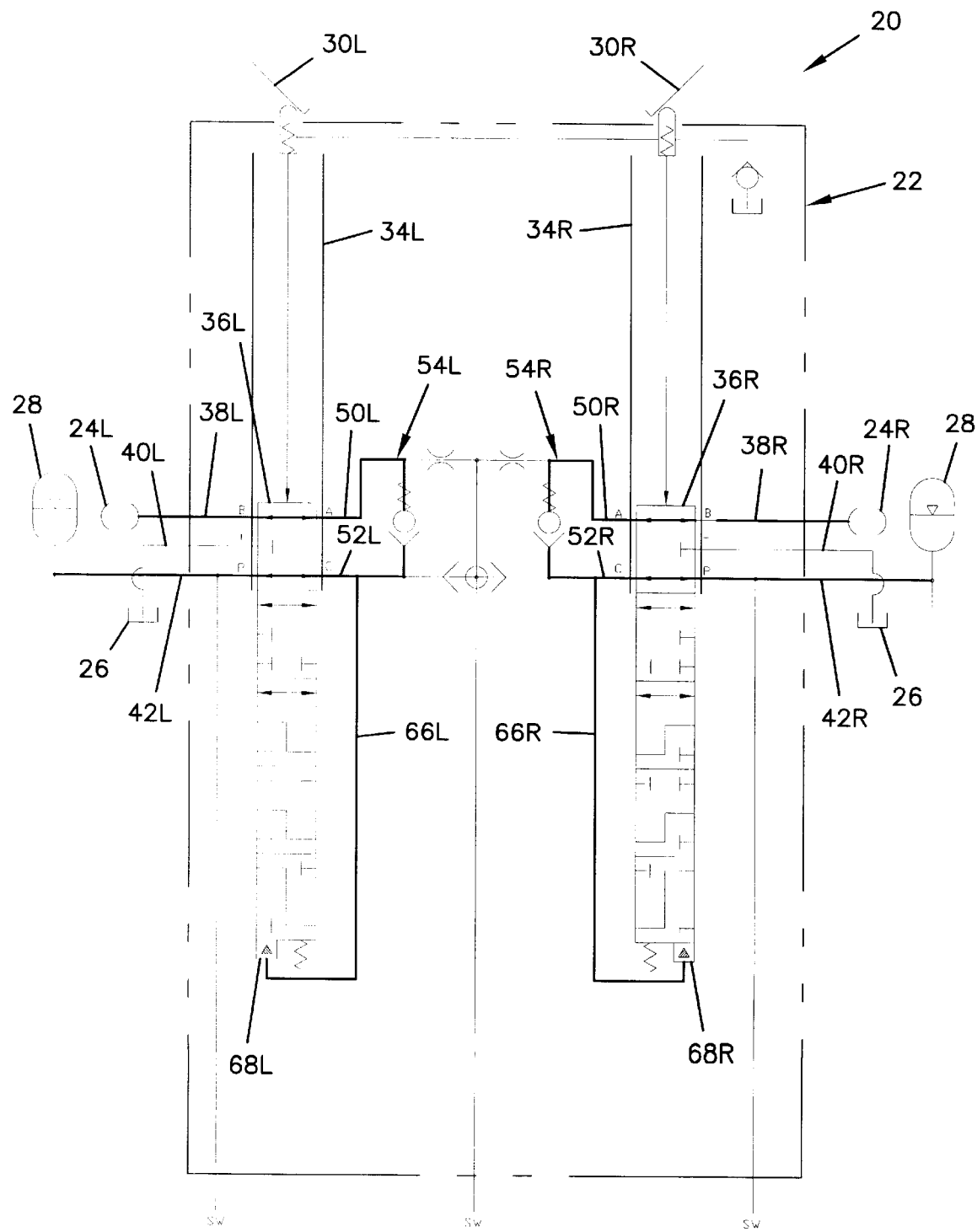
FIG. 5 is a schematic representation of the system of FIG. 1 with the push rods in fifth positions.

FIG. 5 shows each of the push rods $36_L$, $36_R$ in a fifth position. When each of the push rods $36_L$, $36_R$ is in the fifth position, the brake ports $38_L$, $36_R$ are in fluid communication with their corresponding ports $50_L$, $50_R$, the pressure ports $42_L$, $42_R$ are in fluid communication with their corresponding ports $52_L$, $52_R$, and the tank ports $40_L$, $40_R$ are closed. In such a configuration, pressurized hydraulic fluid from the accumulator 28 flows through the pressure ports $42_L$, $42_R$, through the brake passageways $54_L$, $54_R$, and through the brake ports $38_L$, $38_R$, to the hydraulic brakes $24_L$, $24_R$ thereby causing the brakes $24_L$, $24_R$ to be activated.

By way of example, an operator can use the steering assist system 20 to brake a vehicle by depressing or otherwise moving the actuating members $30_L$, $30_R$ such that the push rods $36_L$, $36_R$ are moved by the spring assemblies $70_L$, $70_R$ to the fifth position shown in FIG. 5. As described above, when each push rod $36_L$, $36_R$ is in the fifth position, pressurized hydraulic fluid from the accumulator 28 travels through the dual brake valve 22 and causes the hydraulic brakes $24_L$, $24_R$ to be activated. The pressurized hydraulic fluid from the accumulator 28 also flows through the hydraulic pilot passages $66_L$, $66_R$ causing the hydraulic pilot volumes $68_L$, $68_R$ to be pressurized. The pressure within the hydraulic pilot volumes $68_L$, $68_R$ causes the push rods $36_L$, $36_R$ to move, against the forces provided by the spring assemblies $70_L$, $70_R$, from the fifth position of FIG. 5 to the fourth position of FIG. 4. At the fourth position of FIG. 4, the axial forces applied by the hydraulic fluid in the hydraulic pilot volumes $68_L$, $68_R$ preferably balance the axial forces applied by the spring assemblies $70_L$, $70_R$.

When each push rod $36_L$, $36_R$ is in the fourth position, the pressure ports $42_L$, $42_R$ are closed and a modulated brake pressure (i.e., a brake pressure that is at least slightly less than the pressure provided by the accumulator 28) is provided to the brakes $24_L$, $24_R$. The modulated pressure is provided because the movement of each push rod $36_L$, $36_R$ from the fifth position to the fourth position at least slightly increases the volume of the hydraulic pilot volumes $68_L$, $68_R$ while the pressure ports $42_L$, $42_R$ are closed thereby at least slightly reducing the pressure supplied to the brakes $24_L$, $24_R$.

Thereafter, the push rods $36_L$, $36_R$ will float between the five positions shown in FIGS. 1–5 depending upon the amount of pressure the operator supplies to the push rods $36_L$, $36_R$ through the actuating members $30_L$, $30_R$ and the spring assemblies $70_L$, $70_R$. For example, if the operator releases all pressure from the actuating members $30_L$, $30_R$, the push rods $36_L$, $36_R$ will return to the neutral position of FIG. 1 and the hydraulic brakes $24_L$, $24_R$ will be deactivated. If the operator reduces only some of the pressure applied to the actuating members $30_L$, $30_R$, the push rods $36_L$, $36_R$ will float to one of the intermediate positions between the first positions and the fifth positions until the hydraulic forces provided by the pressurized fluid within the hydraulic pilot volumes $68_L$, $68_R$ balance the spring forces provided by the spring assemblies $70_L$, $70_R$. If the operator increases the pressure applied to the actuating members $30_L$, $30_R$, the push rods $36_L$, $36_R$ will move to the fifth positions until the pressure within the hydraulic pilot volumes $68_L$, $68_R$ exceeds the spring loads provided by the spring assemblies $70_L$, $70_R$ and force the push rods $36_L$, $36_R$ to positions where the push rods are force balanced.

A pressure switch 75 measures the hydraulic pressure at the shuttle valve 62. If the pressure exceeds a predetermined limit, the pressure switch 75 causes a brake light to be illuminated. The positioning of the pressure switch 75 at the shuttle valve 62 is significant because a single switch can detect if: 1) the right brake has been independently actuated; 2) the left brake has been independently actuated; and 3) both brakes have been actuated.

When braking a steering assist vehicle it is desirable that uniform braking pressure be applied to both the left and right hydraulic brakes $24_L$, $24_R$ to prevent inadvertent turning of the vehicle. With conventional steering assist vehicles, applying uniform braking pressure to both the left and right brakes is at times problematic. For example, if an operator applies unequal pressures to the left and right brake pedals of a conventional steering assist vehicle, unequal brake pressures will be provided to the left and right brakes thereby causing unintentional or inadvertent turning during the braking process. A valve in accordance with the principles of the present invention overcomes the above-identified problems by providing the highest pressure present at either of the left and right push rods (or other type of valve member) to both the first and second brake ports. For example, if the pressure is greater at the left push rod than the right push rod, the pressure from the left push rod is shuttled to the right brake such that the pressure at the right brake is elevated to match the pressure at the left brake. Similarly, if the pressure is greater at the right push rod than the left push rod, the pressure from the right push rod is shuttled to the left brake such that the pressure at the left brake is elevated to match the pressure at the right brake.

Figure 6:
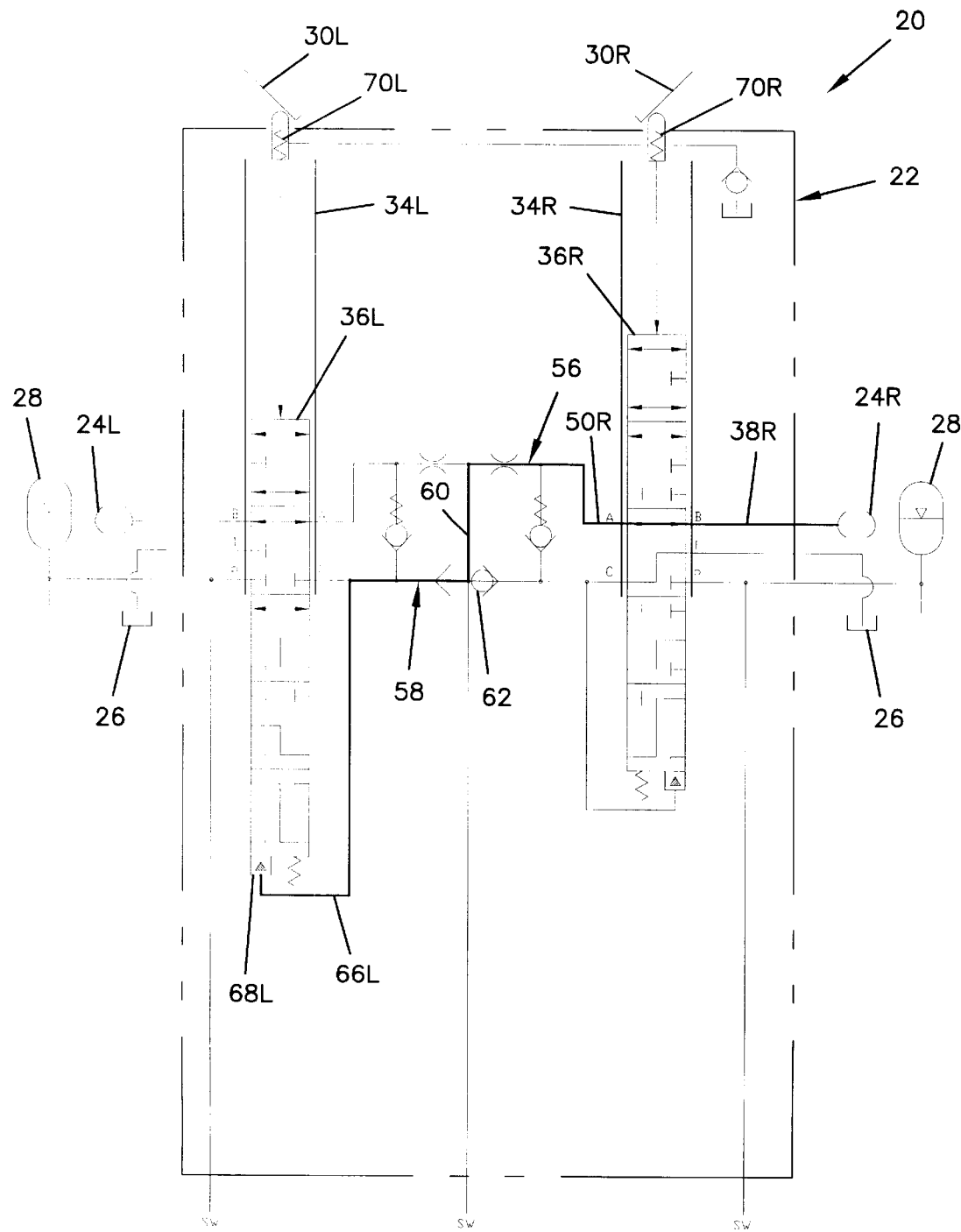
FIG. 6 is a schematic representation of the system of FIG. 1 with more actuating pressure being applied to the left push rod than the right push rod.

FIG. 6 illustrates a situation in which both the left and right brakes $24_L$, $24_R$ have been actuated, but the left actuating member $30_L$ has been actuated more than the right actuating member $30_R$ (i.e., the actuation force provided by the left spring assembly $70_L$ is greater than the actuation force provided by the right spring assembly $70_R$). In such a configuration, the hydraulic pressure in the right hydraulic pilot volume $68_R$ is less than the pressure in the left hydraulic pilot volume $68_L$. This imbalance of pressure causes the ball of the shuttle valve 62 to move rightward and close the right branch of the second cross-passageway 58. With the right branch of the second cross-passageway 58 closed, a bypass passageway (shown in thickened line) is opened. The bypass passageway extends from the left hydraulic pilot passage $66_L$ through the left branch of the second cross-passageway 58 to the bypass line 60. From the bypass line 60, the bypass passageway extends through the right branch of the first cross-passageway 56 to the right port $50_R$. From the right port $50_R$, the bypass passageway extends through the push rod $36_R$ to the brake port $38_R$, and then to the right hydraulic brake $24_R$. In this manner, the higher pressure from the left side of the brake valve 22 moves to the right side of the brake valve 22 to increase the right brake pressure to equal that of the left brake pressure.

Figure 7:
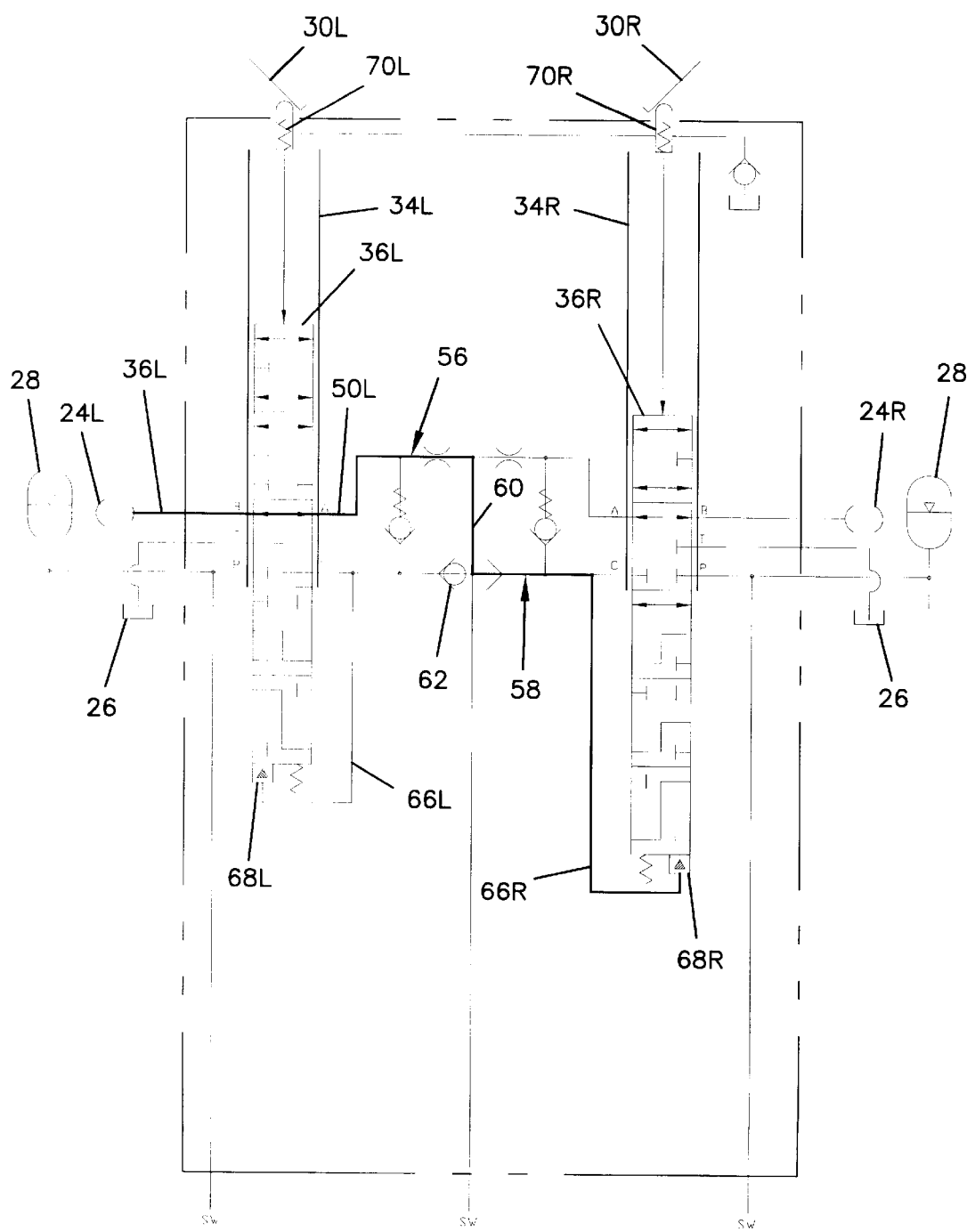
FIG. 7 is a schematic representation of the system of FIG. 1 with more actuating pressure being applied to the right push rod than the left push rod.

FIG. 7 shows a situation in which the right actuating member $30_R$ has been actuated more than the left actuating member $30_L$ (i.e., the actuation force provided by the left spring assembly $70_L$ is less than the actuation force provided by the right spring assembly $70_R$). In such a situation, the hydraulic pressure within the left hydraulic pilot volume $68_L$ is less than the hydraulic pressure in the right hydraulic pilot volume $68_R$. Consequently, the ball of the shuttle valve 62 moves left to close the left branch of the second cross-passageway 58. Concurrently, a bypass passageway (shown in thickened line) is opened between the right hydraulic pilot volume $68_R$ and the left hydraulic brake $24_L$. For example, pressure from the right hydraulic pilot volume $68_R$ moves through the right hydraulic pilot passage $66_R$, through the right branch of the second cross-passageway 58, through the bypass line 60, through the left branch of the first cross-passageway 56, through the left port $50_L$, through the left push rod $36_L$, and through the left brake port $36_L$ to the left hydraulic brake $24_L$. As a result, higher pressure from the right side of the brake valve 22 moves through the brake valve 22 to increase the left brake pressure to equal that of the right brake.

Figure 8:
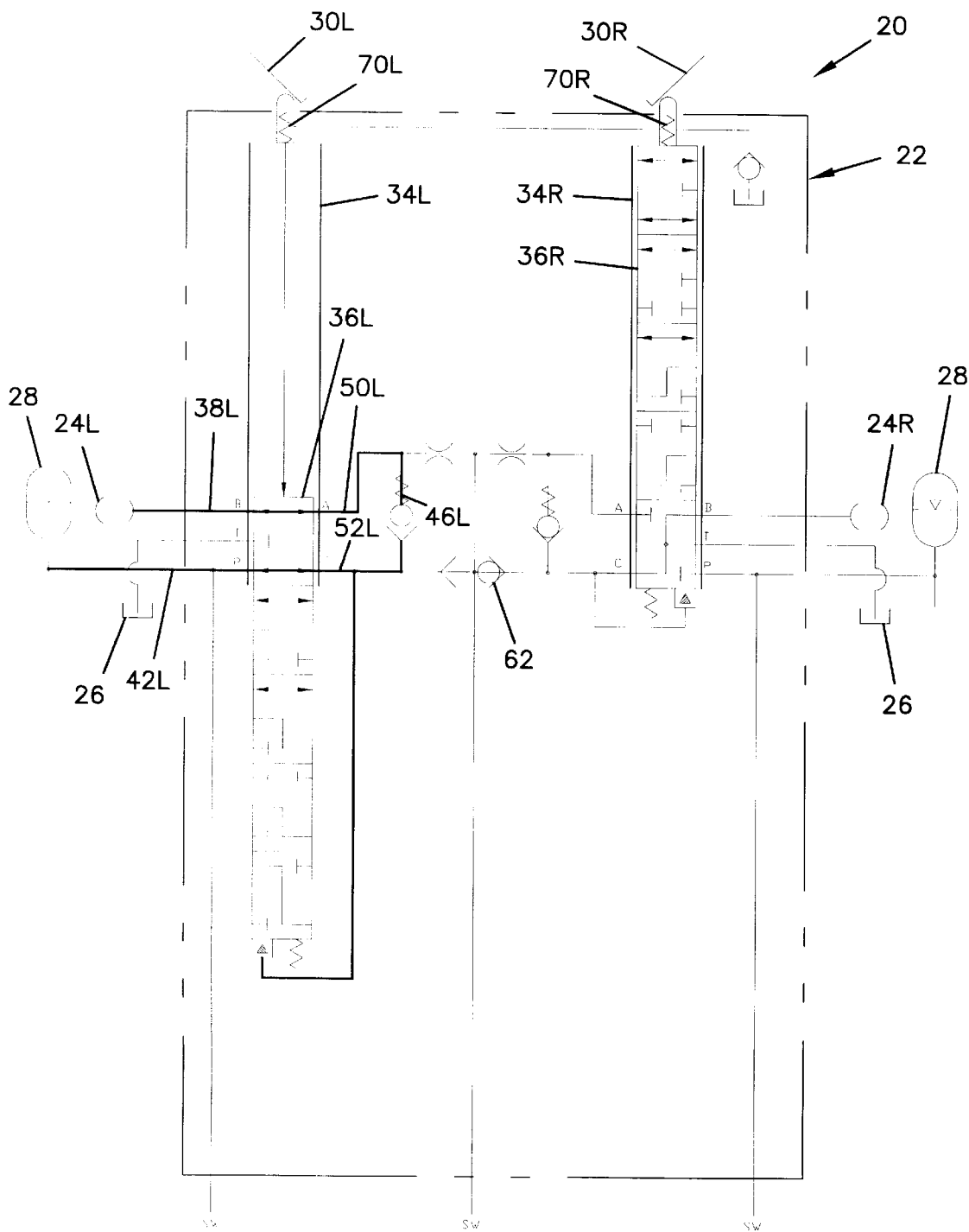
FIG. 8 is a schematic representation of the brake valve of FIG. 1 with the left push rod actuated and the right push rod in the neutral position.

It will be appreciated that the hydraulic brakes also perform a steering assist function. For example, to make a left turn, the left push rod $36_L$ is actuated while the right push rod $36_R$ is left in the neutral position as shown in FIG. 8. In such a configuration pressure from the accumulator 28 moves through the left pressure port $42_L$, through the left push rod $36_L$, through the left port $66_L$, through the left check valve passage $46_L$, through the left port $50_L$, back through the left push rod $36_L$, and through the left brake port $38_L$ to the left hydraulic brake $24_L$. Concurrently, the ball of the shuttle valve 62 moves rightward to prevent the hydraulic pressure from reaching the right brake $24_R$.

Figure 9:
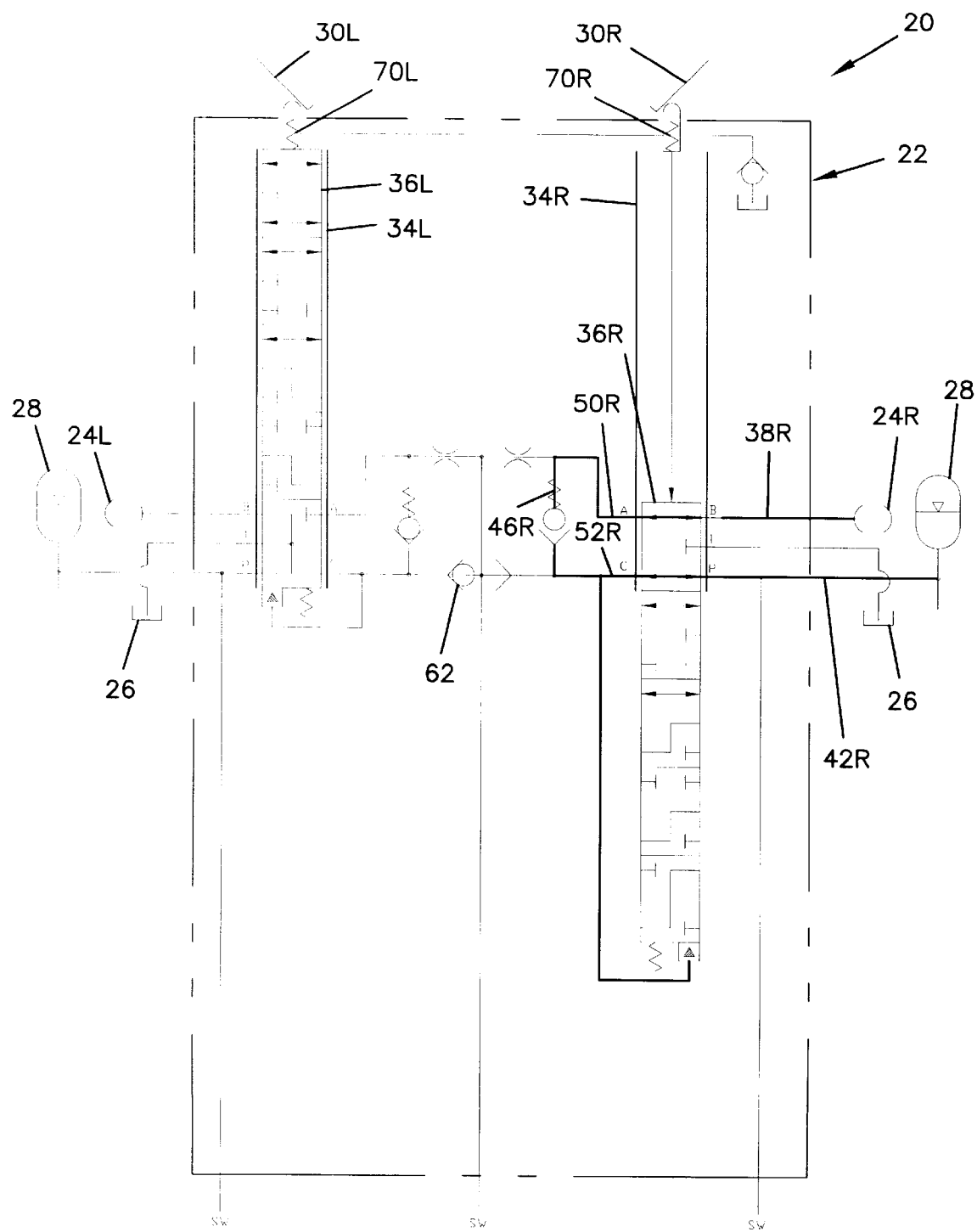
FIG. 9 is a schematic representation of the brake valve of FIG. 1 with the right push rod actuated and the left push rod in the neutral position.

To make a right turn, the right push rod $36_R$ is actuated while the left push rod $36_L$ is oriented in the neutral position. Such a configuration is shown in FIG. 9. With the right push rod $36_R$ actuated, pressure from the actuator 28 moves through the right pressure port $42_R$, through the right push rod $36_R$, through the right port $52_R$, through the right check valve passage $46_R$, through the right port $50_R$, back through the right push rod $36_R$, and through the right brake port $36_R$ to the right hydraulic brake $24_R$. Concurrently, the ball of the shuttle valve 62 moves left to prevent hydraulic pressure from moving through the brake valve 22 to the left hydraulic brake $24_L$.

In addition to the uniform braking pressure identified above, the various aspects of the present invention provides additional advantages. For example, the left and right orifices $64_L$, $64_R$ provide the advantage of limiting the amounts of oil that is exhausted should one of the brake lines rupture. For example, should the right brake line rupture, the right orifice $64_R$ limits the amount of oil that is exhausted, and also allows the left brake $24_L$ to be pressurized. Similarly, should the left brake line rupture, the left orifice $64_L$ limits the amount of oil that is allowed to exhaust through the ruptured brake line, and also allows the right brake $24_R$ to be pressurized.

FIGS. 10–14 provide mechanical illustrations of an embodiment of a brake valve 122 incorporating aspects of the hydraulic configuration schematically shown in FIGS. 1–9. The brake valve 122 includes a pair of push rod connectors 87 adapted for connection to left and right brake pedals (not shown). It is preferred for the push rod connectors 87 to be at least partially mounted within resilient boots 89. Each push rod connector 87 is mechanically coupled to a corresponding push rod 136 (shown in FIG. 12) slidably mounted within the valve body. A spring assembly 170 (shown in FIG. 12) forms a mechanical interface between each push rod 136 and its corresponding push rod connector 87. Since the two push rods 136 and the two spring assemblies 170 are virtually identical, only one of the push rods 136 and its corresponding spring assembly 170 is shown.

Figure 10:
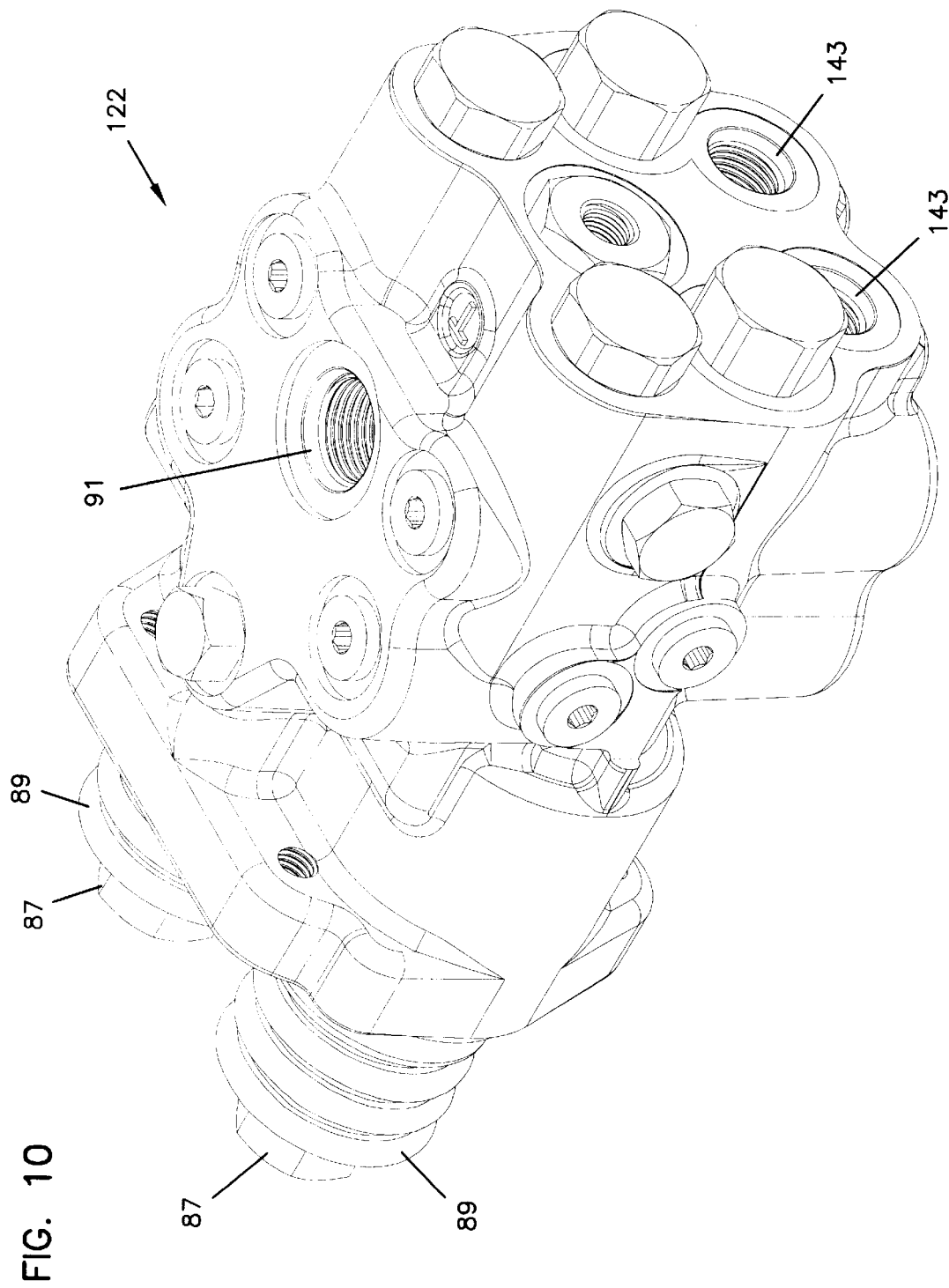
FIG. 10 is perspective view of an embodiment of a dual brake valve in accordance with the principles of the present invention.

Referring to FIG. 10, the dual brake valve 122 includes a main tank port 91 visible at the top of the valve body. The main tank port 91 is adapted for connection to a conventional tank or hydraulic fluid reservoir. A branch tank port 140 (shown in FIG. 12) provides fluid communication between the illustrated push rod 136 and the main tank port 91. It will be appreciated that a similar branch tank port (not shown) provides fluid communication between the non-illustrated push rod and the main tank port 91.

Figure 11:
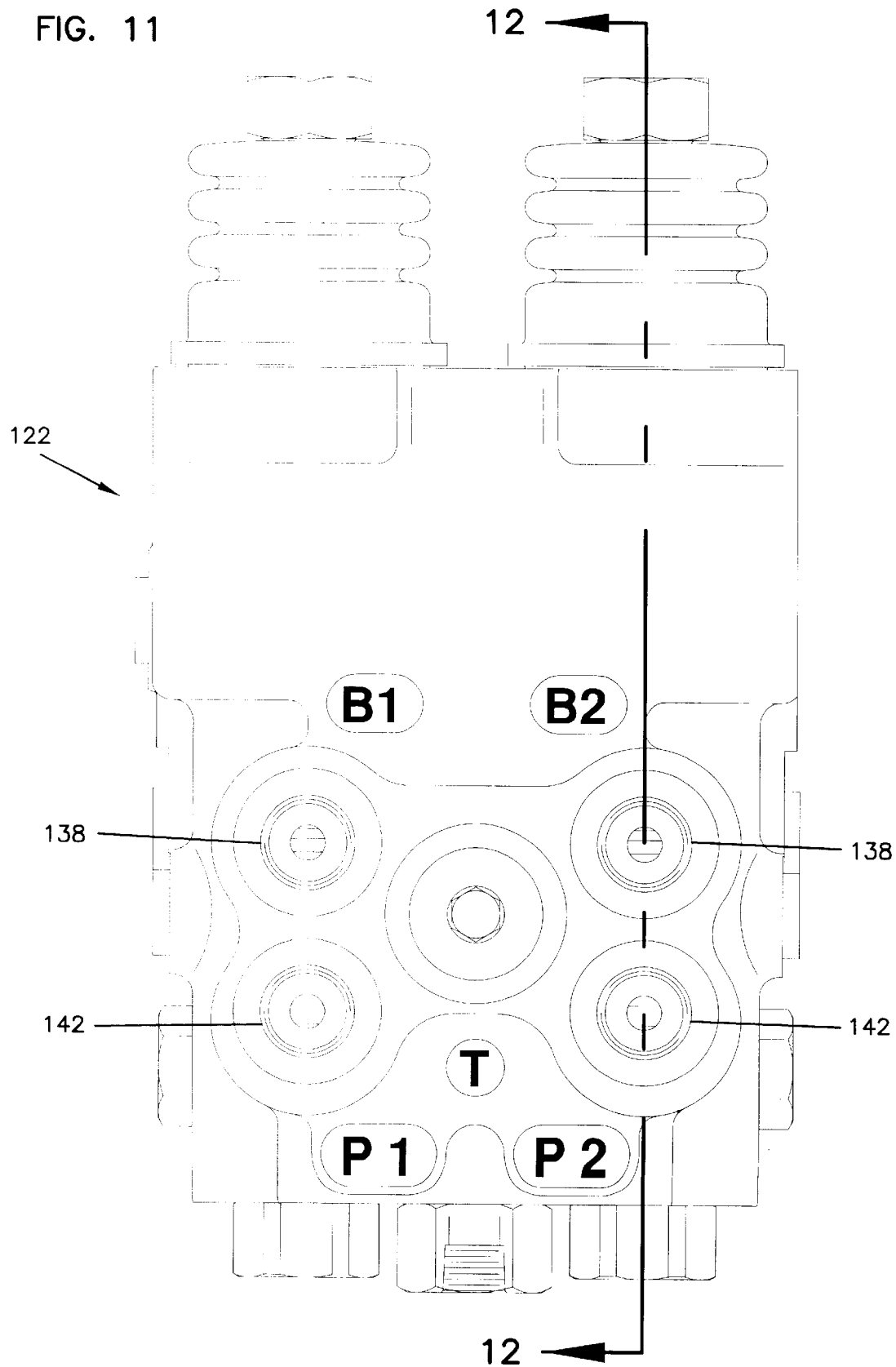
FIG. 11 is a bottom view of the brake valve of FIG. 10.

Referring to FIG. 11, two brake ports 138 and two pressure ports 142 are formed at the bottom of the valve body. The brake ports 138 are adapted to be connected to left and right hydraulic brakes (not shown), and the pressure ports 142 are adapted to be connected to a source of pressure (not shown) such as an accumulator.

Figure 12:
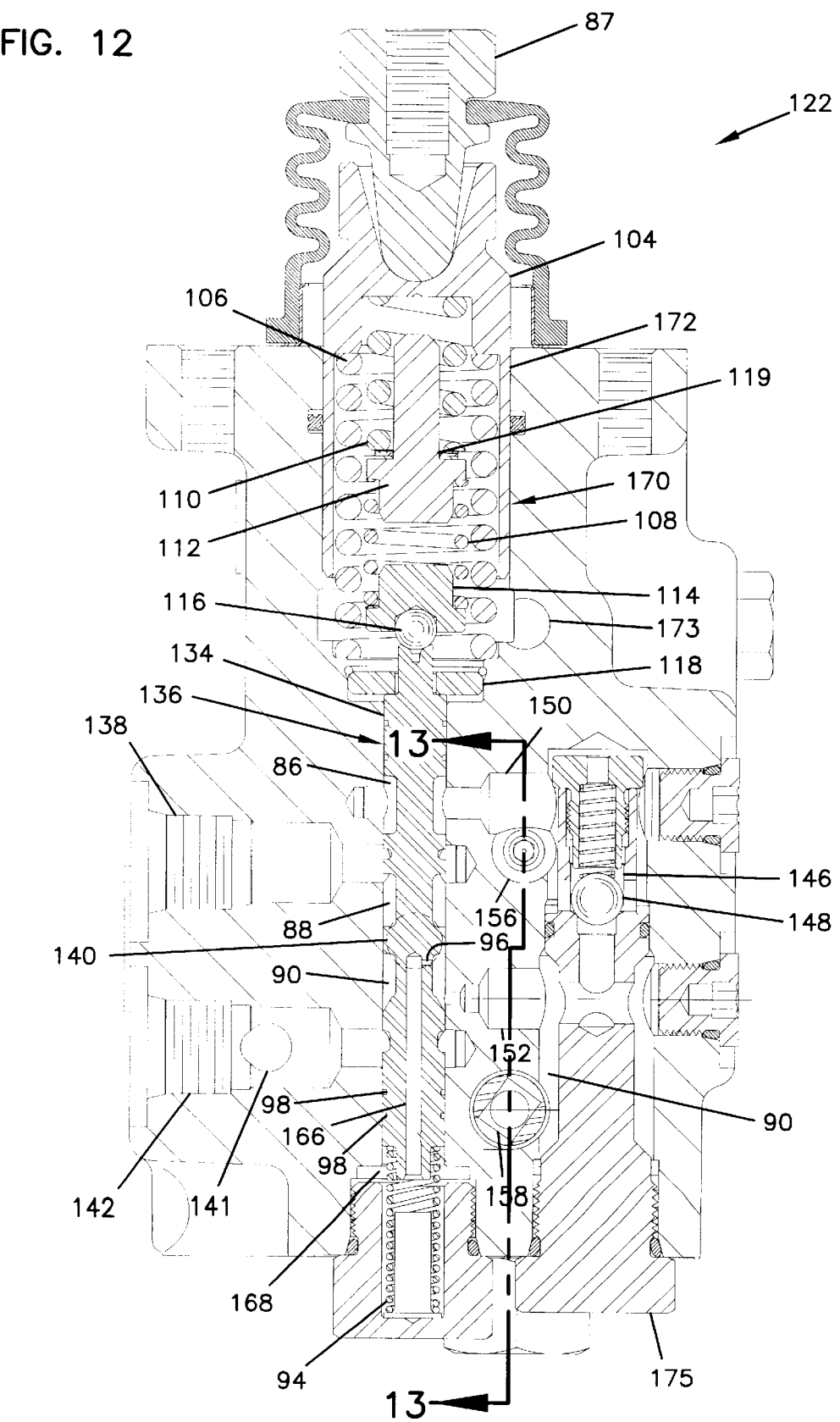
FIG. 12 is a cross-sectional view taken along section line 12—12 of FIG. 11.

FIG. 12 is a cross-sectional view cut lengthwise through one of the push rods 136. As previously described, the two push rods 136 are essentially identical. Also, the flow passages that provide fluid communication between the two push rods 136 are substantially symmetrical. Consequently, the following description of flow passages corresponding to the illustrated push rod are representative of a set of generally symmetrical flow passages corresponding to the non-illustrated push rod.

Referring now to FIG. 12, the illustrated push rod 136 is mounted within a push rod chamber 134. One of the brake ports 138 and one of the pressure ports 142 are in fluid communication with the rod chamber 134. A pressure test passage 141 provides fluid communication between the pressure port 142 and a corresponding pressure switch port 143 (shown in FIG. 10) adapted for receiving a pressure switch (not shown) used to monitor the braking pressure supplied to the valve 122. First and second interior ports 150 and 152 are also in fluid communication with the rod chamber 134. A check valve passage 146 extends between the first and second interior ports 150 and 152. A check valve 148 controls flow through the check valve passage 146. The second interior port 152, the check valve passage 146 and the first interior port 150 cooperate to form an interior loop for transferring pressure from the pressure port 142 to the brake port 138.

Referring still to FIG. 12, the push rod 136 defines first, second and third annular recesses 86, 88 and 90. The annular recesses are configured to provide the five separate valving configurations shown in FIGS. 1–5. In FIG. 12, the push rod 136 is in the neutral position corresponding to FIG. 1. In such a position, the third annular recess 90 provides fluid communication between the second interior port 152 and the branch tank port 140. Additionally, the second annular recess 88 provides fluid communication between the branch tank port 140 and the brake port 138. None of the annular recesses 86, 88 and 90 are in fluid communication with the pressure port 142. Hence, the pressure port 142 is closed. It will be appreciated that by sliding the push rod 136 within the push rod chamber 134, the annular recesses 86, 88 and 90 provide the five separate flow paths shown in FIGS. 1–5.

Figure 13:
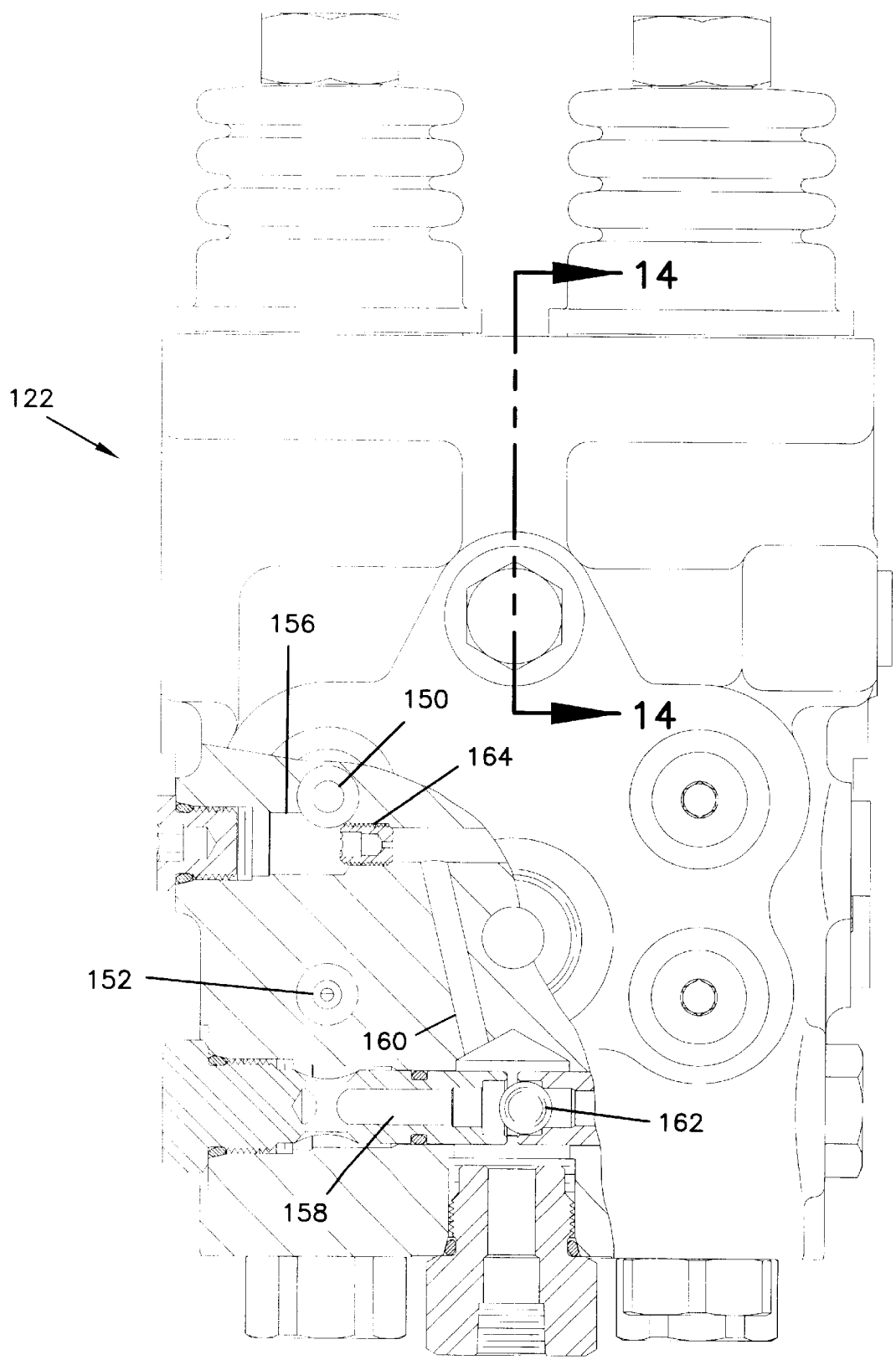
FIG. 13 is a cross-sectional view taken along section line 13—13 of FIG. 12.

Referring again to FIG. 12, the first interior port 150 is in fluid communication with a first cross-passageway 156. As shown in FIG. 13, the first cross-passage 156 is in fluid communication with a bypass line 160. A left orifice 164 is positioned within the first cross-passageway 156 at a location between the first interior port 150 and the bypass line 160. The bypass line 60 extends from the first cross-passageway 156 to a shuttle valve 162. The shuttle valve 162 controls flow through a second cross-passageway 158. As best shown in FIG. 12, fluid communication between the second cross-passageway 158 and the second interior port 152 is provided by an annular passage 92 that surrounds a pressure switch 175.

Referring still again to FIG. 12, a hydraulic pilot volume 168 is located at the lower end of the push rod 136. A spring 194 positioned within the hydraulic pilot volume 168 biases the push rod 136 toward the neutral position. The hydraulic pilot passage 166 extends axially through the center of the push rod 136. One end of the hydraulic pilot passage 166 terminates at the lower end of the push rod 136 to provide fluid communication with the hydraulic pilot volume 168. A radial orifice 96 provides fluid communication between the other end of the hydraulic pilot passage 166 and the third annular recess 90 defined by the push rod 136.

Referring once more to FIG. 12, the push rod 136 defines a plurality of shallow annular grooves 198. The grooves 198 are configured for enhancing lubrication of the push rod 136, center balancing the push rod 136 within the push rod chamber 134, and reducing hydraulic fluid leakage along the push rod 136. The grooves 198 also function as wells for trapping contaminants and assist in inhibiting wear of the left push rod 136.

Referring still to FIG. 12, one particular embodiment of the spring assembly 170 is illustrated. The spring assembly 170 includes a plunger 104 that is slidably mounted in a spring chamber 172. The plunger 104 contacts the push rod connector 87. A return spring 106 is positioned between the plunger 104 and the valve body. When pressure is applied to the push rod connector 87, the plunger 104 slides into the spring chamber 172 against the resistance of the return spring 106. When the pressure is removed from the push rod connector 87, the return spring 106 returns the plunger 104 to a normal position.

The spring assembly 170 also includes a small pressure modulation spring 108 and a large pressure modulation spring 110. The large pressure modulation spring 110 is captured between the plunger 104 and a first retaining member 112. The small pressure modulation spring 108 is captured between the first retaining member 112 and a second retaining member 114. The second retaining member 114 is connected to the push rod 136 by a ball bearing member 116 that functions as a universal joint. A washer 118 prevents the push rod 136 from being removed from the left push rod chamber 134.

The small and large pressure modulation springs 108 and 110 are preferably sized to apply predetermined axial loads upon the push rod 136. For example, the small spring 108 can be sized to apply a maximum load of 300 lbs/in$^2$, and the large spring 110 can be sized to apply a maximum load of 1500 lbs/in$^2$. When the push rod connector 87 is initially depressed, force is transferred from the push rod connector 87 through the plunger 104, through the large spring 110, through the first retaining member 112, through the small spring 108, through the second retaining member 114 through the steel ball 116, to the push rod 136. When the pressure applied by the push rod connector 87 exceeds the maximum load transmittable by the small spring 108, the first and second retaining members 112 and 114 abut against one another such that loading is transferred directly from the first retaining member 112 to the second retaining member 114. In such a configuration, the modulated pressure is controlled by the large pressure modulation spring 110. As the load applied to the large pressure modulation spring 110 continues to increase, the plunger 104 slides within the spring chamber 172.

Before the large pressure modulation spring 110 becomes completely compressed, the plunger 104 preferably bottoms against the valve body. In this manner, the maximum pressure that be reached at the hydraulic brakes is limited by the force of the springs 108 and 110 regardless of higher accumulator pressures or actuating member/pedal force. For example, if the accumulated pressure exceeds the maximum force of the springs 108 and 110 (e.g., 1500 lbs/in$^2$), the hydraulic pressure in the hydraulic pilot volume 168 will push the push rod 136 toward the neutral position against the resistance of the modulation springs 108, 110 thereby causing a lower modulated brake pressure to be supplied to the brakes. It will be appreciated that the maximum brake pressure can be set or adjusted by one or more shims 119 placed between the first retaining member 112 and the large modulation spring 110.

Figure 14:
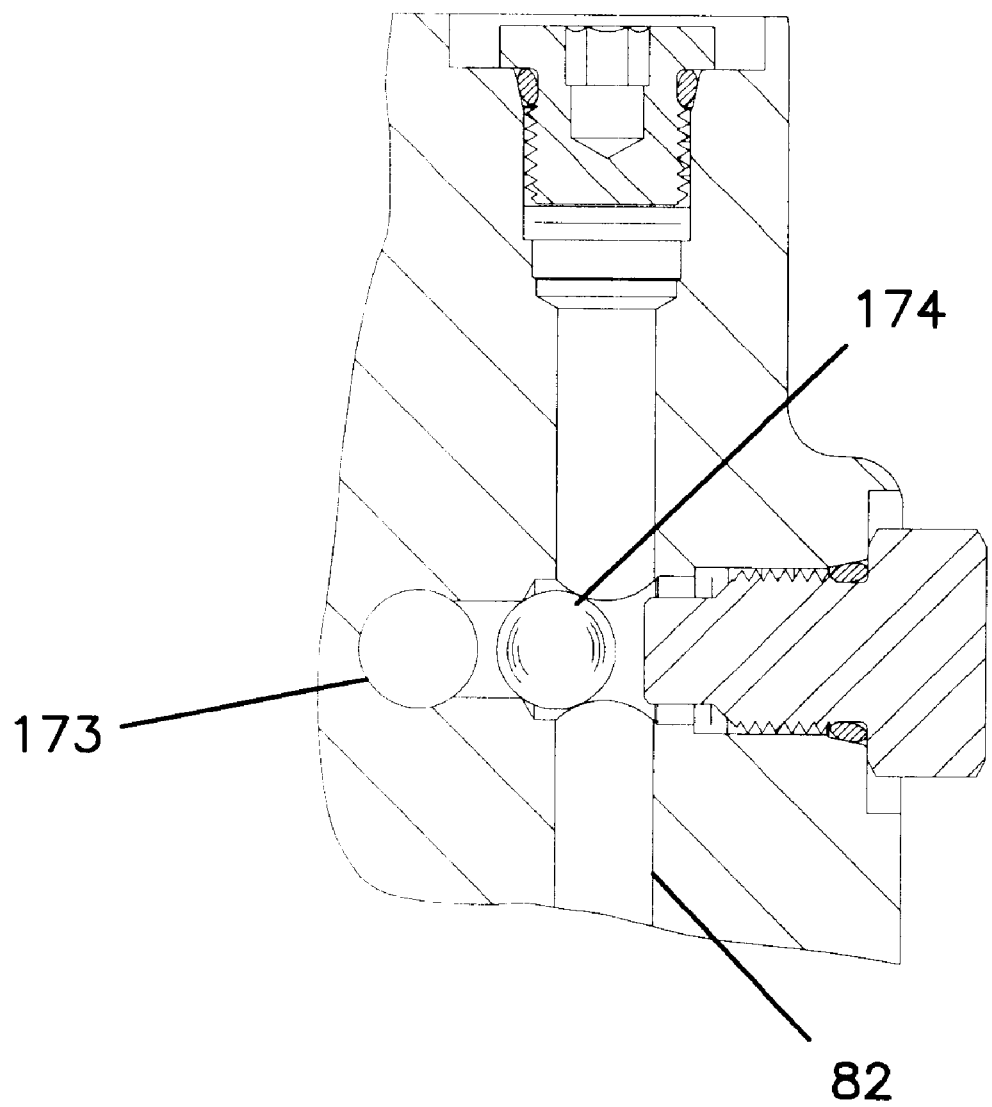
FIG. 14 is a cross-sectional view taken along section line 14—14 of FIG. 13.

Referring now to FIGS. 12 and 14, a passageway 173 provides fluid communication between the two spring chambers 172 (only one shown). A passage 82 provides fluid communication between the main tank port 91 and the passage 173. A check ball 174 controls flow between the tank (not shown) and the spring chambers 172.

A primary application for the various aspects of the present invention relates to steering assist systems. However, it will be appreciated that the invention is also applicable to any application where dual and precise equal pressures (e.g., braking pressures) are desired. For example, certain types of vehicles (e.g., telehandlers) require precise equal braking pressures at front and rear axles. For such an application, a single brake pedal is used to concurrently depress separate brake valve members controlling the front and back brakes. Although a single brake pedal is used, braking pressure variations can at times develop between the front and rear brakes. Valves in accordance with the principles of the present invention can be used to correct such pressure variations.

With regard to the foregoing description, it is to be understood that changes may be made in detail, especially in matters of the shape, size and arrangement of the parts without departing from the scope of the present invention. It is intended that the specification and depicted aspects be considered exemplary only, with a true scope and spirit of the invention being indicated by the broad meaning of the following claims.

I claim:

1. A valve arrangement for use with a steering assist system having left and right brake actuating members, the valve arrangement comprising:

a valve body defining a left brake port adapted for connection to a left hydraulic brake and a right brake port adapted for connection to a right hydraulic brake, the valve body also defining left and right brake pressure ports adapted for connection to a source of hydraulic brake pressure;

the valve body also defining a left brake passageway for providing fluid communication between the left brake pressure port and the left brake port, and a right brake passageway for providing fluid communication between the right brake pressure port and the right brake port;

a left brake push rod for controlling hydraulic fluid flow through the left brake port and through the left brake pressure port, the left brake push rod being adapted to be operatively coupled to the left brake actuating member such that the left brake actuating member can apply an axial actuating force to the left brake push rod;

a right brake push rod for controlling hydraulic fluid flow through the right brake port and through the right brake pressure port, the right brake push rod being adapted to be operatively coupled to the right brake actuating member such that the right brake actuating member can apply an axial actuating force to the right brake push rod;

a left brake hydraulic pilot volume in fluid communication with the left brake passageway, the left brake hydraulic pilot volume being positioned such that hydraulic fluid within the left brake hydraulic pilot volume applies hydraulic pressure axially against the left brake push rod, the hydraulic pressure opposing the axial actuating force provided by the left brake push rod;

a right brake hydraulic pilot volume in fluid communication with the right brake passageway, the right brake hydraulic pilot volume being positioned such that hydraulic fluid within the right brake hydraulic pilot volume applies hydraulic pressure axially against the right brake push rod, the hydraulic pressure opposing the axial actuating force provided by the right brake push rod;

a bypass passage arrangement for providing fluid communication between the left brake passageway and the right brake port, and for providing fluid communication between the right brake passageway and the left brake port; and a plurality of valves for: i) closing the left brake passageway and directing hydraulic fluid pressure from the right brake passageway through the bypass passage arrangement to the left brake port when the hydraulic pressure in the right hydraulic pilot volume exceeds the hydraulic pressure in the left hydraulic pilot volume; and ii) closing the right brake passageway and directing hydraulic fluid pressure from the left brake passageway through the bypass passage arrangement to the right brake port when the pressure in the left hydraulic pilot volume exceeds the hydraulic pressure in the right hydraulic pilot volume.

2. The valve arrangement of claim 1, wherein the plurality of valves includes a first check valve for controlling flow through the left brake passage, a second check valve for controlling flow through the right brake passage, and a shuttle valve for: i) opening and closing fluid communication between the left brake passage and the right brake port; and ii) opening and closing fluid communication between the right brake passage and the left brake port.

3. The valve arrangement of claim 1, further comprising a first orifice positioned along the bypass passage arrangement such that hydraulic fluid from the left brake passageway is required to pass through the first orifice to reach the right brake port.

4. The valve arrangement of claim 3, further comprising a second orifice positioned along the bypass passage arrangement such that hydraulic fluid from the right brake passageway is required to pass through the second orifice to reach the left brake port.

5. The valve arrangement of claim 4, wherein the first and second orifices have diameters in the range of 0.035–0.039 inches.

6. A steering assist system comprising:

left and right hydraulic brakes;

left and right actuating members for respectively actuating the left and right brakes;

a source of hydraulic brake pressure;

a valve body defining a left brake port connected to the left hydraulic brake and a right brake port connected to the right hydraulic brake, the valve body also defining left and right brake pressure ports connected to the source of hydraulic brake pressure;

the valve body also defining a left brake passageway for providing fluid communication between the left brake pressure port and the left brake port, and a right brake passageway for providing fluid communication between the right brake pressure port and the right brake port;

a left brake push rod for controlling hydraulic fluid flow through the left brake port and through the left brake pressure port, the left brake push rod being adapted to be operatively coupled to the left brake actuating member such that the left brake actuating member can apply an axial actuating force to the left brake push rod;

a right brake push rod for controlling hydraulic fluid flow through the right brake port and through the right brake pressure port, the right brake push rod being adapted to be operatively coupled to the right brake actuating member such that the right brake actuating member can apply an axial actuating force to the right brake push rod;

a left brake hydraulic pilot volume in fluid communication with the left brake passageway, the left brake hydraulic pilot volume being positioned such that hydraulic fluid within the left brake hydraulic pilot volume applies hydraulic pressure axially against the left brake push rod, the hydraulic pressure opposing the axial actuating force provided by the left brake push rod;

a right brake hydraulic pilot volume in fluid communication with the right brake passageway, the right brake hydraulic pilot volume being positioned such that hydraulic fluid within the right brake hydraulic pilot volume applies hydraulic pressure axially against the right brake push rod, the hydraulic pressure opposing the axial actuating force provided by the right brake push rod;

a bypass passage arrangement for providing fluid communication between the left brake passageway and the right brake port, and for providing fluid communication between the right brake passageway and the left brake port; and a plurality of valves for: i) closing the left brake passageway and directing hydraulic fluid pressure from the right brake passageway through the bypass passage arrangement to the left brake port when the hydraulic pressure in the right hydraulic pilot volume exceeds the hydraulic pressure in the left hydraulic pilot volume; and ii) closing the right brake passageway and directing hydraulic fluid pressure from the left brake passageway through the bypass passage arrangement to the right brake port when the pressure in the left hydraulic pilot volume exceeds the hydraulic pressure in the right hydraulic pilot volume.

7. The valve arrangement of claim 6, wherein the plurality of valves includes a first check valve for controlling flow through the left brake passage, a second check valve for controlling flow through the right brake passage, and a shuttle valve for: i) opening and closing fluid communication between the left brake passage and the right brake port; and ii) opening and closing fluid communication between the right brake passage and the left brake port.

8. The valve arrangement of claim 6, further comprising a first orifice positioned along the bypass passage arrangement such that hydraulic fluid from the left brake passageway is required to pass through the first orifice to reach the right brake port.

9. The valve arrangement of claim 8, further comprising a second orifice positioned along the bypass passage arrangement such that hydraulic fluid from the right brake passageway is required to pass through the second orifice to reach the left brake port.

10. The valve arrangement of claim 9, wherein the first and second orifices have diameters in the range of 0.035–0.039 inches.

11. The valve arrangement of claim 1, wherein the source of hydraulic brake pressure comprises an accumulator.

12. A braking system comprising:

first and second hydraulic brakes;

first and second actuating members for respectively actuating the first and second brakes;

a hydraulic pressure source;

a valve body defining a first brake port connected to the first hydraulic brake and a second brake port connected to the second hydraulic brake, the valve body also defining first and second brake pressure ports connected to the source of hydraulic pressure;

the valve body also defining a first brake passageway for providing fluid communication between the first brake pressure port and the first brake port, and a second brake passageway for providing fluid communication between the second brake pressure port and the second brake port;

a first brake valve member for controlling hydraulic fluid flow through the first brake port and through the first brake pressure port, the first brake valve member being operatively coupled to the first brake actuating member;

a second brake valve member for controlling hydraulic fluid flow through the second brake port and through the second brake pressure port, the second brake valve member being operatively coupled to the second brake actuating member;

a bypass passage arrangement for providing fluid communication between the first brake passageway and the second brake port, and for providing fluid communication between the second brake passageway and the first brake port; and a plurality of valves for: i) closing the first brake passageway and directing hydraulic fluid pressure from the second brake passageway through the bypass passage arrangement to the first brake port when the second brake actuating member has been actuated more than the first brake actuating member; and ii) closing the second brake passageway and directing hydraulic fluid pressure from the first brake passageway through the bypass passage arrangement to the second brake port when the first brake actuating member has been actuated more than the second brake actuating member.

13. The steering assist system of claim 12, wherein the second brake actuating member and the first brake actuating member comprise pedals.

14. The steering assist system of claim 12, wherein the first brake valve member and the second brake valve member comprise push rods.

15. The valve arrangement of claim 12, wherein the plurality of valves includes a first check valve for controlling flow through the first brake passage, a second check valve for controlling flow through the second brake passage, and a shuttle valve for: i) opening and closing fluid communication between the first brake passage and the second brake port; and ii) opening and closing fluid communication between the second brake passage and the first brake port.

16. The valve arrangement of claim 12, firer comprising a first orifice positioned along the bypass passage arrangement such that hydraulic fluid from the first brake passageway is required to pass through the first orifice to reach the second brake port.

17. The valve arrangement of claim 16, further comprising a second orifice positioned along the bypass passage arrangement such that hydraulic fluid from the second brake passageway is required to pass through the second orifice to reach the first brake port.

18. The valve arrangement of claim 15, further comprising a pressure sensor positioned at the shuttle valve.

19. A pressure balancing valve arrangement comprising:

a valve body defining a first pressure output port and a second pressure output port, the valve body also defining first and second pressure input ports adapted for connection to a source of hydraulic pressure;

the valve body also defining a first passageway for providing fluid communication between the first pressure input port and the first pressure output port, and a second passageway for providing fluid communication between the second pressure input port and the second pressure output port;

a first valve member for controlling hydraulic fluid flow through the first pressure input port and through the first pressure output port;

a second valve member for controlling hydraulic fluid flow through the second pressure input port and through the second pressure output port;

a first hydraulic pilot volume in fluid communication with the first passageway, the first hydraulic pilot volume being positioned such that hydraulic fluid within the first hydraulic pilot volume applies hydraulic pressure against the first valve member;

a second hydraulic pilot volume in fluid communication with the second passageway, the second hydraulic pilot volume being positioned such that hydraulic fluid within the second hydraulic pilot volume applies hydraulic pressure against the second valve member;

a bypass passage arrangement for providing fluid communication between the first passageway and the second pressure output port, and for providing fluid communication between the second passageway and the first pressure output port; and a plurality of valves for: i) closing the first passageway and directing hydraulic fluid pressure from the second passageway through the bypass passage arrangement to the first pressure output port when the hydraulic pressure in the second hydraulic pilot volume exceeds the hydraulic pressure in the first hydraulic pilot volume; and ii) closing the second passageway and directing hydraulic fluid pressure from the first passageway through the bypass passage arrangement to the second pressure output port when the pressure in the first hydraulic pilot volume exceeds the hydraulic pressure in the second hydraulic pilot volume.

20. The valve arrangement of claim 19, further comprising a first spring assembly for applying pressure to the first valve member in a direction opposite to the hydraulic pressure applied by the hydraulic fluid in first hydraulic pilot volume, and a second spring assembly for applying pressure to the second valve member in a direction opposite to the hydraulic pressure applied by the hydraulic fluid in second hydraulic pilot volume.

21. The valve arrangement of claim 20, wherein the first and second valve members comprise push rods.

22. The valve arrangement of claim 19, where in the plurality of valves includes a first check valve for controlling flow through the first passage, a second check valve for controlling flow through the second passage, and a shuttle valve for: i) opening and closing fluid communication between the first passage and the second pressure output port; and ii) opening and closing fluid communication between the second passage and the second pressure output port.

* * * * *

UNITED STATES PATENT AND TRADEMARK OFFICE
CERTIFICATE OF CORRECTION

PATENT NO. : 6,217,128 B1 Page 1 of 1
DATED : April 17, 2001
INVENTOR(S) : Tillman, Jr.

It is certified that error appears in the above-identified patent and that said Letters Patent is hereby corrected as shown below:

Column 4,
Line 39, "$66_L$" should read -- $52_L$ --

Column 5,
Lines 15, 18, 32, 39 and 45, "$36_R$" should read -- $38_R$ --
Line 18, "$66_L$" should read -- $52_L$ --
Line 27, "$50_L$" should read -- $52_L$ --

Column 7,
Line 55, "$66_L$" should read -- $52_L$ --

Column 14,
Line 31, "firer" should read -- further --

Signed and Sealed this

Twenty-sixth Day of August, 2003

JAMES E. ROGAN
*Director of the United States Patent and Trademark Office*